United States Patent [19]

Kunz et al.

[11] Patent Number: 4,761,348

[45] Date of Patent: Aug. 2, 1988

[54] ELECTROLYTIC CELL STACK WITH MOLTEN ELECTROLYTE MIGRATION CONTROL

[75] Inventors: H. Russell Kunz, Vernon; Robin J. Guthrie, East Hartford; Murray Katz, Newington, all of Conn.

[73] Assignee: The United States of America as represented by the United States Department of Energy, Washington, D.C.

[21] Appl. No.: 26,819

[22] Filed: Mar. 17, 1987

[51] Int. Cl.[4] .................... H01M 8/04; H01M 8/24; H01M 2/08

[52] U.S. Cl. ...................................... 429/35; 429/36; 429/14; 429/18

[58] Field of Search .................... 424/14, 16, 18, 35, 424/36

[56] References Cited

U.S. PATENT DOCUMENTS

| | | | |
|---|---|---|---|
| 4,348,874 | 10/1985 | Katz et al. | 429/35 X |
| 4,411,968 | 10/1983 | Reiser et al. | 429/41 |
| 4,478,776 | 10/1984 | Maricle et al. | 429/44 X |
| 4,579,788 | 4/1986 | Marianowski et al. | 429/36 X |
| 4,596,751 | 6/1987 | Kunz et al. | 429/16 X |
| 4,643,954 | 2/1987 | Smyth | 429/14 X |

OTHER PUBLICATIONS

Swarr et al, U.S. patent application Ser. No. 823,718.
*Evolution of Natural Gas Molten Carbonate Power Plants,* Gas Research Institute Quarterly Report, Jan. 1983.
*Development of Molten Carbonate Fuel Cell Power Technology,* U.S. Dept. of Energy, Oct. 1983, Reports 15 and 16.

*Primary Examiner*—Brian E. Hearn
*Assistant Examiner*—Stephen J. Kalafut
*Attorney, Agent, or Firm*—Hugh W. Glenn; Robert J. Fisher; Judson R. Hightower

[57] ABSTRACT

An electrolytic cell stack includes inactive electrolyte reservoirs at the upper and lower end portions thereof. The reservoirs are separated from the stack of the complete cells by impermeable, electrically conductive separators. Reservoirs at the negative end are initially low in electrolyte and the reservoirs at the positive end are high in electrolyte fill. During stack operation electrolyte migration from the positive to the negative end will be offset by the inactive reservoir capacity. In combination with the inactive reservoirs, a sealing member of high porosity and low electrolyte retention is employed to limit the electrolyte migration rate.

11 Claims, 3 Drawing Sheets

ELECTROLYTIC CELL STACK WITH MOLTEN ELECTROLYTE MIGRATION CONTROL

CONTRACTUAL ORIGIN OF THE INVENTION

The U.S. Government has rights in this invention pursuant to Contract No. DE-AC01-79ET15440 between the U.S. Department of Energy and the United Technologies Corporation.

BACKGROUND OF THE INVENTION

This invention relates to fuel cell and electrolysis cell stacks. It particularly relates to improvements in molten carbonate fuel cell stacks directed to delay and control the effects of electrolyte migration.

Molten carbonate fuel cells and stacks of such cells are well known and described in various prior publications and patents. For example, U.S. Pat. No. 4,478,776 to Maricle et al. and U.S. Pat. No. 4,411,968 to Reiser et al. illustrate typical fuel cells and stacks of such cells. Porous, sintered nickel-chromium anodes and porous nickel oxide cathodes are disposed on opposite major surfaces of a porous electrolyte matrix. A matrix of such as lithium aluminate ($LiAlO_2$), or other inert ceramic is filled with molten alkali metal carbonate electrolyte, (eg. $Li_2CO_3/K_2CO_3$) in each fuel cell of a stack. Stacks with several hundred fuel cells are contemplated in a typical power supply. Severe electrolyte redistribution has been observed even in experimental stacks with substantially fewer cells than that expected for an operational power supply.

The exact mechanism by which the electrolyte migrates is not clearly understood. Nonetheless, it is known that the cells near the negative end of the stack become flooded while the cells towards the positive end of the stack become depleted or dry of molten electrolyte. It is known that an electrical shunt current through the manifold gasket causes electrolyte migration towards the negative end of the stack. The flooding and depletion of electrolyte severely impair the performance of the affected cells and greatly increase the overall resistance of the stack.

In prior fuel cell stacks, the manifold gasket was selected to provide a good seal against gas leakage. Such a seal was porous, with small pores sized to significantly fill with molten electrolyte. Although high electrolyte content minimizes gas leakages, it unfortunately promotes electrolyte migration.

The efforts to eliminate electrolyte redistribution have not been completely successful since most porous gaskets, wetted with electrolyte will conduct the electrolyte to the negative end of the stack. If the fuel cell stack is arranged with the positive end at the bottom and the negative end at the top, gravity will resist migration of electrolyte towards the more negative cells. However, this is not sufficient to prevent redistribution of electrolyte towards the upper cells.

Therefore in view of the above, it is an object of the present invention to provide a fuel cell stack with improved electrolyte migration control.

It is a further object to provide fuel cell stack improvements for limiting the rate of electrolyte migration.

It is also an object of the present invention to provide fuel cell stack improvements to delay the effect of electrolyte migration beyond the normal operating cycle of the fuel cell stack.

SUMMARY OF THE INVENTION

In accordance with the present invention, there is provided an improved fuel cell stack including a plurality of fuel cells extending from the positive to the negative end of the stack. Individual cells include a porous anode member, a porous cathode member and a porous matrix of ceramic material for containing electrolyte between the anode and cathode pairs. Adjacent cells are separated by impermeable, electrically conductive separator sheets in the stack of cells. Porous sealing means are placed at the outer margins of the stack face for sealing to the gas supply and gas discharge. The fuel cell stack includes means for delaying and controlling the migration of molten electrolyte.

The fuel cell stack also includes porous reservoirs in electrolyte conducting communication with cells at the most negative and cells at the most positive end portions of the stack. The reservoirs are adapted to admit and contain electrolyte migrating towards the most negative cells and to restore electrolyte to the most positive cells from which electrolyte migrates.

In other aspects of the invention, the electrolytic cell stack includes porous sealing means with a portion of increased porous volume at the negative end portion of the stack and a portion of its length of lesser volume at the midportion of the stack. The portion of increased volume serves as a reservoir for admitting and containing electrolyte migrating towards the most negative cells in the stack.

In other aspects of the invention, the porous sealing means at the midportion of the stack include a fiberous ceramic strip capable of containing no more than about 4% by volume molten electrolyte. The ceramic strip includes smooth fibers of about 5 to 20 microns diameter, a porosity of more than 90%, a width of about 1 to 2 cm and a thickness of about 0.1 to 0.2 cm. The ceramic fibers are selected from ceramics such as lithium aluminate, lithium zirconate, alumina, ceria and calcia or yttria stabilized zirconia.

In other aspects of the invention, the reservoirs include a first porous layer of electronically conductive material at the negative end portion of the stack exposed to the oxidant gas supply and a second porous layer of electronically conductive material at the positive end portion of the stack exposed to the fuel gas supply. The first and second porous layers, each are separated from adjacent electrodes and electrolyte matricies by an electrolyte impermeable, electrically conductive layer.

In other aspects of the invention, an additional porous layer of electronically conductive material is placed at the negative end portion of the stack exposed to the fuel gas supply and separated from the adjacent porous layer exposed to the oxidant gas supply by an electrolyte impermeable, electrically conductive layer.

In one other more specific aspect of the invention, an electrolyte reservoir is positioned in electrolyte communication with an anode member in the negative end portion of the stack exposed to the anode gas supply.

In an alternative configuration, the electrolyte reservoir at the negative end of the stack is an anode member of greater thickness than an individual anode member in the midportion of the stack.

The present invention also contemplates an electrolytic cell stack with a plurality of cells from a positive to a negative end portion, the edge surfaces of the cells forming a first vertical face sealed to the oxidant gas supply and a second vertical face sealed to the fuel gas supply. The fuel cell stack includes, in combination, electrolyte reservoirs in the negative end portion, the positive end portion and sealing means in the midportion thereof. The electrolyte reservoirs include porous layers of electrically conductive material wettable by molten electrolyte and separated from adjacent electrode matricies by an electrolyte impermeable, electrically conductive layer. The sealing means extending between the reservoirs at the negative and the positive end portions of the stack are resistant to electrolyte migration between the positive and negative end portions. The electrolyte reservoir in the negative end portion of the stack initially contains substantially less electrolyte than the electrolyte reservoir at the postive end portion of the stack.

In one other aspect of the invention, the sealing means includes a fiberous ceramic strip along the marginal portions of the stack face for sealing to the fuel and oxidant gas supplies. The strip is of smooth fibers of about 5–20 microns in diameter, defining a porosity of more than 90%, a width of about 1–2 cm, a thickness of about 0.1 to 0.2 cm, to resist migration along the height of the stack.

In further aspects of the invention, the porous sealing means includes a fiberous, porous ceramic strip containing only about 4% by volume molten electrolyte.

In other aspects of the invention, the width and cross section of the porous ceramic strip is increased at the negative end portion of the fuel cell stack to provide additional capacity for electrolyte.

BRIEF DESCRIPTION OF THE DRAWINGS

The present invention is illustrated in the accompanying drawings wherein.

DETAILED DESCRIPTION OF THE PREFERRED EMBODIMENT

Figure 1:
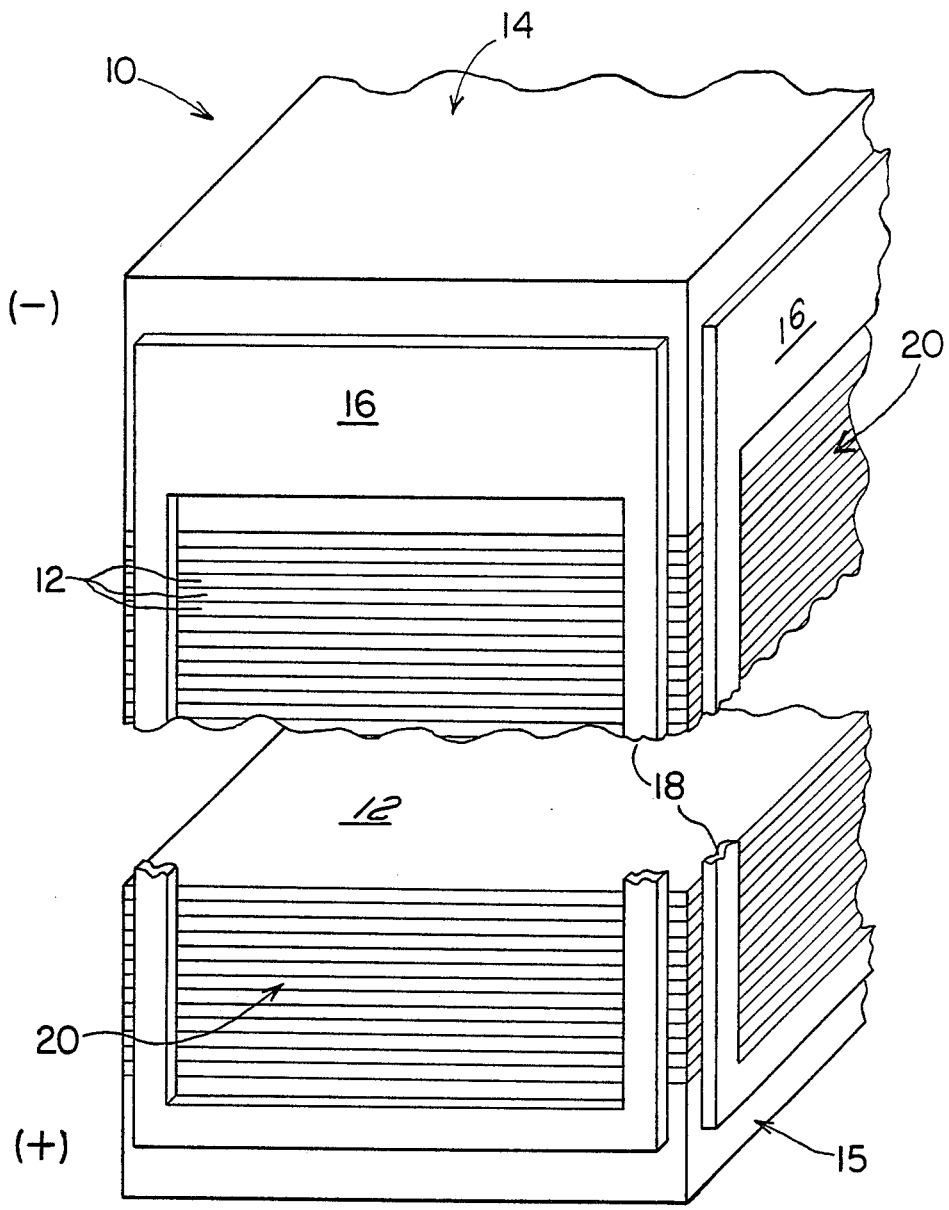
FIG. 1 is a perspective view of a fuel cell stack with portions thereof broken away.
Figure 2:
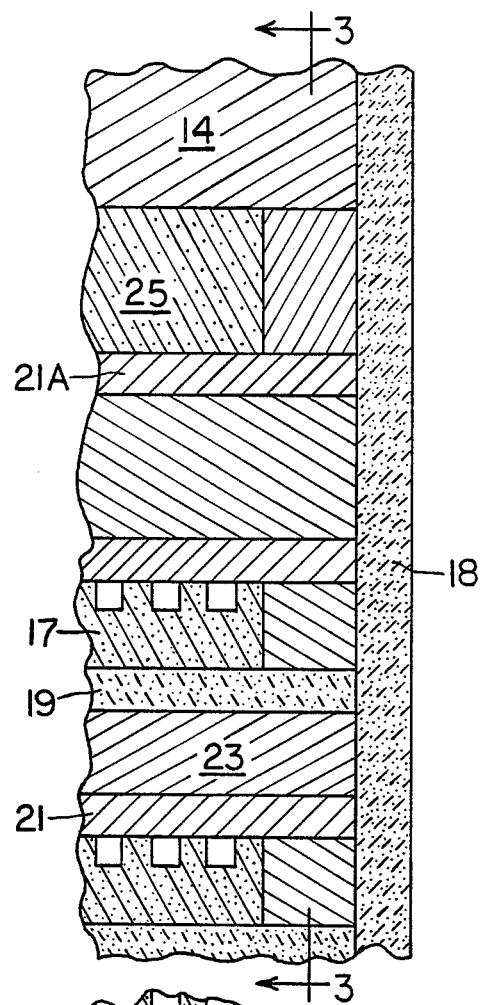
FIG. 2 is an enlarged fragmentary view in cross-section of the positive and negative end portions of the fuel cell stack.

FIGS. 1 and 2 illustrate a fuel cell stack 10 to which the improvements of the present invention are applicable. The stack comprises a plurality of individual fuel cells 12 between end plates 14 and 15 at the negative and positive ends of the stack. The stack 10 ordinarily is arranged with individual cells 12 separated by electrically conductive, impermeable layers 21 and with the anodes arranged at the top of the cathodes in each cell. This establishes negative polarity at the stack top and positive polarity at the stack bottom.

The fuel cell stack is illustrated with four vertical faces 20 for mating with manifolds (not shown) for supplying oxidant and fuel gases and for withdrawing the reaction products and unused reactant gases. Sealing members 18 are provided at the stack faces for sealing to the gas supply and collection manifolds.

In high temperature, molten electrolyte cells, sealing members 18 are selected from porous ceramic material, for instances of lithium aluminate, lithium zirconate, alumina, ceria or of zirconia stabilized with calcia or with yttria. In addition, a support frame (not shown) such as described in Guthrie, U.S. Pat. No. 4,414,294 may be provided in conjunction with sealing member 18.

Figure 3:
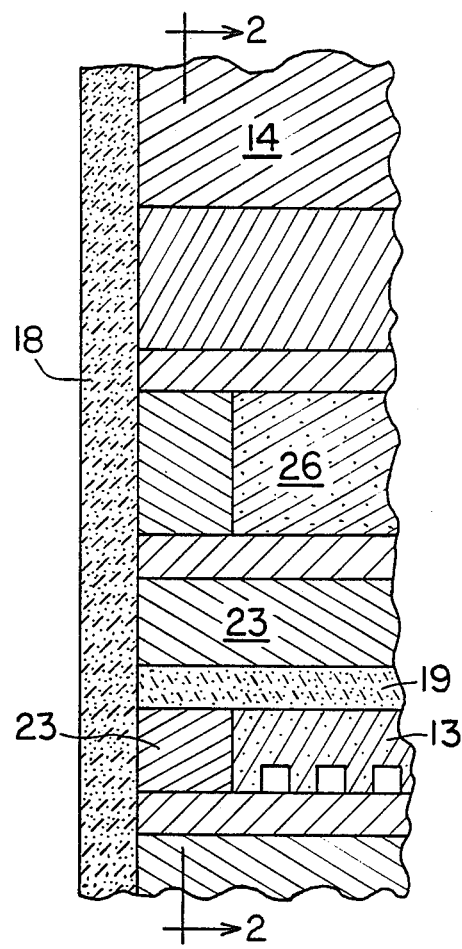
FIG. 3 is a fragmentary cross-sectional view at Section 3—3 indicated in FIG. 2.

The molten electrolyte, typically the molten carbonate, $Li_2CO_3/K_2CO_3$ in a ratio of about 1.6 to 1.0 is retained in a porous matrix 19 placed between the anode 17 and cathode 13 of each cell as illustrated in FIGS. 2 and 3. Matrix 19 extends laterally to the cell stack face 20 and serves as a wet seal with molten carbonate electrolyte between each anode and cathode pair. Consequently, the molten electrolyte is present at stack face 20 in contact with manifold gasket 18. Separator sheets 21 of electrolyte impermeable, corrosive resistant metal e.g. of nickel or of stainless steel are provided between individual cells within the stack. Rails 23 of corrosion resistant, gas impermeable material provide a gas sealing function to isolate the anode and the cathode electrodes from the oxidant and fuel gases respectively.

The porous matrices can be a tape or compact of a particulate material inert to the molten carbonate environment. Lithium aluminate is a suitable matrix material but ceria, stabilized zirconia, lithium zirconate, etc. also may be used.

The anodes and cathodes can be of porous nickel. A small percentage of chromium can add stability to the anode structure as is described in U.S. patent application Ser. No. 823,718 filed 1/29/86 by Swarr et al. A nickel cathode will convert to nickel oxide on exposure to the oxidant gas at molten carbonate fuel cell conditions.

In FIG. 1 the upper portions 16 of porous sealing members 18 are provided of increased cross sectional area and volume to serve as reservoirs for molten electrolyte migrating towards the negative end of the cell stack. Although not shown, a similar sealing member portion of increased porous volume may be employed at the positive end of the stack to provide extra electrolyte for the most positive cells which typically dry first in operation. In operating an electrolytic cell stack of this configuration, the cells in the lower, positive stack portion are initially filled to a high level with electrolyte while the cells in the upper negative portion are intitially low in electrolyte. As will be discussed below, sealing members 18 in the midportion of the stack advantageously are provided of reduced cross section to limit the rate of electrolyte migration.

Referring to FIGS. 2 and 3, various other aspects of the present invention are described and illustrated. Reservoirs 25 and 27 are disposed at the upper, negative and at the lower, positive end portions of the fuel cell stack respectively. In addition, another reservoir 26 is illustrated below and separated from reservoir 25 by an electronically conductive, electrolyte impermeable separator plate 21A. Reservoir 26 is exposed to the oxidant cas supply and thereby provides collection for electrode migration at the oxidant gas face of the stack.

Reservoirs 25, 26 and 27 can be similar in structure to that selected for anode use. Preferrably the reservoirs are of greater thickness than the thickness of an anode located in the midportion of the stack. Porous electrically conductive structures of such as nickel or nickel-chromium alloys with in excess of 50% porosity, e.g. 50–60% porosity can be selected for reservoir use. Advantageously, reservoir 26 at the negative end of the stack is exposed to oxidant gas to electrolytically urge migrating electrolyte into the reservoir. However, there also is advantage to having at least one reservoir open to migrating electrolyte at each stack face in the negative end portions. Where nickel structures are employed those exposed to fuel gas should better retain structural integrity than those exposed to oxidant gas. It will be clear that a plurality of reservoir layers may be provided at both the top and the bottom portions of the fuel cell stack.

Accordingly, the molten carbonate contained within the reservoir 27 provides make up as electrolyte migrates from the lower portion of the cell stack. Correspondingly, reservoirs 25 and 26 at the upper end, initially will not be filled and will serve to accept electrolyte migration during stack operation. Therefore, the employment of these reservoirs is expected to substantially prolong the operation of the fuel cell stack between servicing shut-downs for redistribution of electrolyte.

Figure 4:
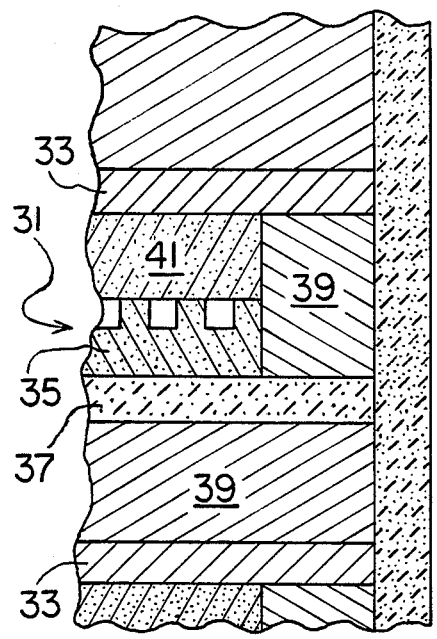
FIG. 4 is an enlarged fragmentary cross-sectional view of an upper portion of a fuel cell stack.

FIG. 4 illustrates an alternative reservoir arrangement with a fuel cell 31 near the top of a stack defined between electrolyte impermeable separators 33. An anode 35 is shown in contact with electrolyte matrix 37 and with protective rails 39 shielding both the anode and the cathode (not shown) from oxidant and fuel gases respectively. An additional porous plaque 41 is provided above anode 35 at anode polarity to serve as a reservoir for migrating electrolyte. Reservoir 41 is open at its edge surface to the stack face at which fuel gas enters the anode. This configuration provides an electrolyte reservoir as part of the anode structure without need for additional separator plates.

Figure 5:
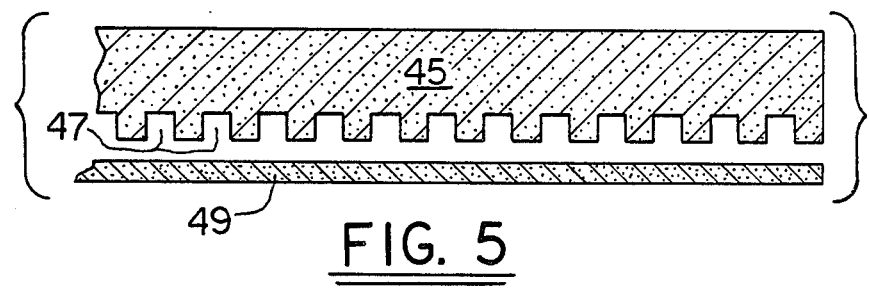
FIG. 5 is a fragmentary exploded view of an alternative electrode-reservoir arrangement for a fuel cell stack.

FIG. 5 illustrates an alternative arrangement in which an electrolyte reservoir 45 includes channels 47 for forming a reactant gas passages when layered onto an electrode 49. This arrangement can be used in place of the anode-reservoir combination shown in FIG. 4.

The inventors have found that the use of sealing members of modified construction can substantially limit the rate of electrolyte migration. In the central portion of the stack, sealing members 18 are provided of substantially smaller cross section and of special construction to reduce capacity for molten electrolyte and thereby limit electrolyte migration. Typically, the sealing members 18 in the stack midportion are strips of about 0.1 to 0.2 cm thickness, a width of about 1 to 2 cm and a porosity of more than 90%. These sealing members are made up of large smooth fibers of about 5 to 20 microns diameter to effectively limit their electrolyte capacity. During operation in a fuel cell stack such sealing members will contain no more than about 4% by volume molten electrolyte. This is in contrast to previous sealing member designs having low porosity and small pore sizes which fill with electrolyte and thereby promote electrolyte migration.

Applicants large diameter fibers are heat treated or sintered in a mat or felt to provide smooth, large fibers that do not absorb and fill with electrolyte.

As an operating example of applicants novel sealing member, a fuel cell stack with 20 fuel cells was sealed with a gasket or sealing member having about 0.2 cm thickness, about 1 cm width with about 20 microns fiber diameter. The top section of the gasket across the negative end portion of the stack was of about four centimeters in width to provide a reservoir for the migrating electrolyte. Initially, the lower cells were highly filled with molten electrolyte while the upper, most negative cells were low in electrolyte with only enough to permit electrolytic reaction. The stack operated for over 5,000 hours before substantial electrolyte migration caused flooding of the upper fuel cells and drying of the lower fuel cells in the stack.

It will be clear that the above described improvements are applicable to various types of electrolyte cell stacks. Both fuel and electrolysis cells employing a wide range of molten or liquid electrolytes may advantageously incorporate the present invention.

Although the present invention has been described in terms of the specific embodiments materials and conditions, it will be clear that various changes in the materials, parts and details can be made by one skilled in the art within the scope of the following claims.

The embodiments of this invention in which an exclusive property or privilege is claimed are defined as follows:

1. In an electrolytic cell stack including a plurality of electrolytic cells with electrically conductive, electrolyte impermeable separator sheets between adjacent cells in said stack, the electrolytic cells including a porous anode member, a porous cathode member and a porous matrix for molten electrolyte disposed in the stack between major surfaces of the anode and cathode members, said stack having a negative end portion and a positive end portion at opposite ends thereof with the edge surfaces of the cells forming a first stack face for admitting a supply of oxidant gas and the edge surfaces forming a second stack face for admitting a supply of fuel gas, porous sealing means at the outer margins of the first stack face and at the outer margins of the second stack face for sealing to the supply of oxidant gas and to the supply of fuel gas, the improvement comprising:

a first porous reservoir layer in the negative end portion of said stack having an edge surface thereof exposed to the supply of oxidant gas at the first stack face and being in electrolyte communication with the sealing means for receiving and containing electrolyte migrating towards the negative end of said stack, said first porous layer being separated from all adjacent electrodes and matrices by an electrolyte impermeable, electrically conducted layer;

a second porous reservoir layer in the positive end portion of said stack having an edge surface exposed at the second stack face and being in electrolyte communication with the second sealing means for providing reserve electrolyte to fuel cells in the positive end portion of the stack, said second porous layer being separated from all adjacent electrodes and matrices by an electrolyte impermeable electrically conducted layer; and wherein said porous sealing means having a portion of increased cross-section and volume at the negative end portion of said stack and having a portion of its length of lesser volume and cross-section at the midportion of said stack for restricting molten electrolyte migration from the positive to the negative end portion of the stack.

2. The electrolytic cell stack of claim 1 wherein said porous sealing means at the midportion of said stack comprises a fiberous ceramic strip containing no more than about 4% by volume molten electrolyte to restrict electrolyte migration.

3. The electrolytic cell stack of claim 2 wherein said porous sealing means in the midportion of said stack comprises a fiberous ceramic strip having smooth fibers of about 5 to 20 microns diameter, a porosity of more than 90%, a width of about 1 to 2 cm and a thickness of about 0.1 to 0.2 cm.

4. The electrolytic cell stack of claim 3 wherein said porous sealing means is selected from the group of ceramics consisting of lithium aluminate, lithium zirconate, alumina, ceria, and calcia or yttria stabilized zirconia.

5. The electrolytic cell stack of claim 1 further comprising an additional porous reservoir layer of electrically conductive material at the negative end portion of said stack exposed to fuel gas at said second vertical face and separated from said first porous layer and adjacent electrodes and electrolyte matrices by at least one electrolyte impermeable, electrically conductive layer at a major surface of the reservoir layer.

6. The electrolytic cell stack of claim 5 wherein said additional porous layer is of compacted particles of nickel-chromium alloy having a porosity in excess of 50%.

7. The electrolytic cell stack of claim 1 wherein said first reservoir layer is of greater thickness than that of an individual anode member in the midportion of said stack.

8. An electrolytic cell stack with a plurality of cells from a positive to a negative end portion, the edge surfaces of said cells forming a first vertical face with sealing means for oxidant gas and a second vertical face with sealing means for fuel gas, said cell stack further comprising the combination of an electronically conductive, electrolyte reservoir in the negative end portion thereof, an electronically conductive, electrolyte reservoir in the positive end portion thereof and sealing means in the midportion thereof, said electrolyte reservoir comprising porous layers of electronically conductive material wettable by electrolyte and separated from adjacent electrodes and matrices by an electrolyte impermeable, electronically conductive layer, said sealing means extending between said reservoirs in the negative and positive stack end portions and being resistant to electrolyte migration between the positive and negative end portions of said stack.

9. The electrochemical cell stack of claim 8 wherein said electrolyte reservoir at the positive end portion of said stack is filled initially with substantially more electrolyte than the electrolyte reservoir at the negative end portion of said stack.

10. The electrolytic cell stack of claim 8 wherein said sealing means comprises a fiberous ceramic strip along marginal portions of a stack faces, said strip is of smooth fibers of about 5-20 microns diameter defining a porosity of more than 90%, a width of about 1-2 cm, a thickness of about 0.1 to 0.2 cm, to restrict electrolyte migration along the height of the electrolytic cell stack.

11. The electrolytic cell stack of claim 8 wherein cells in the positive end portion are filled with electrolyte to a substantially higher level than corresponding cells in the negative end portion of said stack.

* * * * *